(12) United States Patent
Tokunaga et al.

(10) Patent No.: US 10,453,154 B2
(45) Date of Patent: Oct. 22, 2019

(54) POWER ADJUSTMENT SYSTEM, POWER ADJUSTMENT METHOD, AND COMPUTER PROGRAM

(71) Applicant: Panasonic Intellectual Property Management Co., Ltd., Osaka (JP)

(72) Inventors: Yoshihiko Tokunaga, Hyogo (JP); Seiichi Miyazaki, Osaka (JP); Naohiro Fukuda, Chiba (JP); Hiroyuki Kuriyama, Kanagawa (JP); Norimasa Ota, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 491 days.

(21) Appl. No.: 14/910,909

(22) PCT Filed: Jul. 31, 2014

(86) PCT No.: PCT/JP2014/004015
§ 371 (c)(1),
(2) Date: Feb. 8, 2016

(87) PCT Pub. No.: WO2015/019584
PCT Pub. Date: Feb. 12, 2015

(65) Prior Publication Data
US 2016/0196621 A1      Jul. 7, 2016

(30) Foreign Application Priority Data

Aug. 9, 2013 (JP) ................................. 2013-166524

(51) Int. Cl.
*G06Q 10/06*          (2012.01)
*G06Q 50/06*          (2012.01)
(Continued)

(52) U.S. Cl.
CPC ............. *G06Q 50/06* (2013.01); *G05B 15/02* (2013.01); *G05F 1/66* (2013.01); *G06Q 10/06* (2013.01);
(Continued)

(58) Field of Classification Search
CPC ......................... G06Q 10/06; G06Q 10/06315
(Continued)

(56) References Cited

U.S. PATENT DOCUMENTS 8,457,802 B1 * 6/2013 Steven ................... G06Q 10/00
                                                       700/291
2003/0045969 A1    3/2003 Matsuo et al.
(Continued)

FOREIGN PATENT DOCUMENTS

CA    2 860 743 A1    8/2013
EP    2 485 189 A1    8/2012
(Continued)

OTHER PUBLICATIONS

International Search Report dated Sep. 16, 2014, issued in corresponding International Application No. PCT/JP2014/004015. (w/ partial English translation).
(Continued)

*Primary Examiner* — Hai Tran
(74) *Attorney, Agent, or Firm* — McDermott Will & Emery LLP

(57) ABSTRACT

The power adjustment system includes a first estimator, a second estimator, a calculator, a controller, and a determiner. The first estimator estimates power to be consumed by an electric load during an interested period. The second estimator estimates power obtainable from a power supply apparatus during the interested period. The calculator determines a profit in the interested period by calculating a difference between income and a cost. The controller selects
(Continued)

one of a first state of supplying power from a power storage apparatus to a power grid and a second state of supplying power from the power storage apparatus to the electric load. The determiner provides an instruction to the controller so as to maximize the profit in the interested period.

12 Claims, 3 Drawing Sheets

(51) Int. Cl.
    *G06Q 40/00*    (2012.01)
    *G05B 15/02*    (2006.01)
    *G05F 1/66*    (2006.01)
    *H02J 3/38*    (2006.01)
    *H02J 7/35*    (2006.01)

(52) U.S. Cl.
    CPC ....... *G06Q 10/06315* (2013.01); *G06Q 40/12* (2013.12); *H02J 3/382* (2013.01); *H02J 3/383* (2013.01); *H02J 7/35* (2013.01); *Y02E 10/563* (2013.01); *Y02E 10/566* (2013.01); *Y02P 90/90* (2015.11)

(58) Field of Classification Search
    USPC ....................................................... 705/7.25
    See application file for complete search history.

(56) References Cited

U.S. PATENT DOCUMENTS

| | | | |
|---|---|---|---|
| 2004/0254899 A1 | 12/2004 | Abe et al. | |
| 2010/0306027 A1* | 12/2010 | Haugh | G06Q 10/04 705/7.36 |
| 2011/0046806 A1* | 2/2011 | Nagel | H04L 67/125 700/291 |
| 2012/0229081 A1 | 9/2012 | Kiuchi et al. | |
| 2012/0249056 A1 | 10/2012 | Ukita et al. | |
| 2012/0306271 A1* | 12/2012 | Kuriyama | H02J 9/00 307/23 |
| 2012/0323386 A1* | 12/2012 | Ito | H02J 3/32 700/291 |
| 2013/0006831 A1* | 1/2013 | Mise | G06Q 10/06 705/37 |
| 2013/0088083 A1 | 4/2013 | Tominaga | |
| 2014/0035374 A1 | 2/2014 | Oka | |
| 2014/0336837 A1* | 11/2014 | Kiuchi | G05B 15/02 700/295 |
| 2014/0379154 A1 | 12/2014 | Watanabe et al. | |
| 2015/0214776 A1 | 7/2015 | Ukita et al. | |
| 2016/0196622 A1 | 7/2016 | Tokunaga et al. | |

FOREIGN PATENT DOCUMENTS

| | | |
|---|---|---|
| EP | 2 535 999 A1 | 12/2012 |
| JP | 2000-224769 A | 8/2000 |
| JP | 2002-015036 A | 1/2002 |
| JP | 2002-233053 A | 8/2002 |
| JP | 2003-244840 A | 8/2003 |
| JP | 2004-023914 A | 1/2004 |
| JP | 2004-336890 A | 11/2004 |
| JP | 2006-158146 A | 6/2006 |
| JP | 2006-285450 A | 10/2006 |
| JP | 2006-352933 A | 12/2006 |
| JP | 2007-020260 A | 1/2007 |
| JP | 2008-021152 A | 1/2008 |
| JP | 2011-087383 A | 4/2011 |
| JP | 2011-130618 A | 6/2011 |
| JP | 2012-053721 A | 3/2012 |
| JP | 2012-060761 A | 3/2012 |
| JP | 2012-210073 A | 10/2012 |
| JP | 2012-222860 A | 11/2012 |
| JP | 2012-228103 A | 11/2012 |
| WO | 2011/065495 A1 | 6/2011 |
| WO | 2012057119 A1 | 5/2012 |

OTHER PUBLICATIONS

Specification and Preliminary Amendment as-filed in related subject matter U.S. Appl. No. 14/910,919, filed Feb. 8, 2016.
International Search report dated Sep. 16, 2014, issued in subject matter related International Application No. PCT/JP2014/004075 (Partial English translation provided).
Extended European Search Report issued in corresponding European Patent Application No. 14835304.8, dated Jun. 30, 2016.
European Communication pursuant to Article 94(3) EPC, issued in corresponding European Patent Application No. 14 833 992.2, dated Jun. 7, 2017.
Extended Search Report issued in corresponding European Patent Application No. 14833992.2, dated Jun. 29, 2016.

\* cited by examiner

| UNIT PRICE (YEN) | 7.00 or less | 7.00 -7.50 | 7.50 -8.10 | 8.10 -8.50 | 8.50 -9.00 | 9.00 or more |
|---|---|---|---|---|---|---|
| ENERGY (1000kWh) | 28 | 22 | 13 | 7 | 5 | 0 |

| UNIT PRICE (YEN) | 7.00 or less | 7.00 -7.20 | 7.20 -9.00 | 9.00 or more |
|---|---|---|---|---|
| ENERGY (1000kWh) | 0 | 7 | 12 | 25 |

POWER ADJUSTMENT SYSTEM, POWER ADJUSTMENT METHOD, AND COMPUTER PROGRAM

RELATED APPLICATIONS

This application is the U.S. National Phase under 35 U.S.C. § 371 of International Application No. PCT/JP2014/004015, filed on Jul. 31, 2014, which in turn claims the benefit of Japanese Application No. 2013-166524 filed on Aug. 9, 2013, the disclosures of which are incorporated by reference herein.

TECHNICAL FIELD

The invention relates generally to power adjustment systems, power adjustment methods, and computer programs and, more particularly, to a power adjustment system configured to cause a power supply apparatus situated in a customer facility to supply power to a power grid, a power adjustment method for the power adjustment system, and a computer program for realizing the power adjustment system.

BACKGROUND ART

Recently, there is a customer facility that includes a power generation apparatus (power generation device) and a power storage apparatus (electricity storage device). Regarding such a customer facility, there is provided a technique that enables a resident of the customer facility to act as an electricity retailer to sell the electricity to a person of another customer facility (see JP 2012-53721 A (hereinafter, referred to as "Document 1"), for example).

Document 1 mentions the feature of: estimating energy to be generated by a power generation device by calculation; and determining a power selling day based on a market price of power during a certain period, a price of power of an electric power company, and a price of power uniquely determined by the electricity retailer (the resident of the customer facility) so as to maximize the income. Document 1 also mentions a method of using a system power supply, the power generation device (power generation apparatus) and the electricity storage device (power storage apparatus) appropriately so as to maximize the income.

The technique described in Document 1 uses a photovoltaic power generation device and the electricity storage device, and the power generated by the photovoltaic power generation device is stored in the electricity storage device. In this technique, a day with a higher market price is determined as an optimum day for power selling, and the power stored in the electricity storage device is sold in this day.

In order to determine the optimum day for power selling, Document 1 also mentions the feature of: forecasting a price of power with regard to each of days in a certain period (N days); determining candidate dates for power selling in view of the prices of power; and determining a day(s) expected to be the highest, in a price of power, of the N days, based on past data. Document 1 also mentions that a day which is the highest, in a total of a price of power of the candidate date and a market price of power, of the N days is determined and is selected as the optimum day for power selling.

It is also mentioned in Document 1 that estimated total power consumption of the N days, an expected price of power of the power retailer, and a price of power of the system power supply are also used for the calculation of the income.

The technique described in Document 1 aims to maximize the income to be obtained from an electricity market, and for this purpose forecasts the market price of power with regard to each of multiple days, and determines a day expected to give the maximum income. According to the technique described in Document 1, therefore, the price of power with regard to each of the N days is needed to be forecasted by the resident of the customer facility.

DISCLOSURE OF THE INVENTION

The objective of the present invention is to propose a power adjustment system capable of increasing a profit to be earned by a person of a customer facility without forecasting a price in an electricity market when the customer facility including a power supply apparatus supplies power to a power grid. Additionally or alternatively, the present invention is aimed to propose a power adjustment system for the power adjustment system, and/or a computer program realizing the power adjustment system.

A power adjustment system according to an aspect of the present inventions includes: a first estimator configured to estimate power to be consumed by an electric load of a customer facility during an interested period to obtain first power information indicative of estimated power; a second estimator configured to estimate power obtainable from a power storage apparatus of the customer facility during the interested period to obtain second power information indicative of estimated power; a calculator configured to determine a profit with regard to the interested period by calculating a difference between income to be received for supplying power to a power grid and a cost to be paid for receiving power from the power grid, based on first price information about a price for receiving power from the power grid, second price information about a price for supplying power to the power grid in the interested period, the first power information, and the second power information; a controller configured to select one of a first state of supplying power from the power storage apparatus to the power grid and a second state of supplying power from the power storage apparatus to the electric load; and a determiner configured to provide the controller with an instruction indicating a time for selecting one of the first state and the second state so as to maximize the profit in the interested period calculated by the calculator.

A power adjustment method according to an aspect of the present invention includes: a first estimator estimating power to be consumed by an electric load of a customer facility during an interested period to obtain first power information indicative of estimated power; a second estimator estimating power obtainable from a power storage apparatus of the customer facility during the interested period to obtain second power information indicative of estimated power; a calculator determining a profit with regard to the interested period by calculating a difference between income to be received for supplying power to a power grid and a cost to be paid for receiving power from the power grid, based on first price information about a price for receiving power from the power grid in the interested period, second price information about a price for supplying power to the power grid in the interested period, the first power information, and the second power information; and a controller selecting one of a first state of supplying power from the power storage apparatus to the power grid and a second state of supplying power from the power storage apparatus to the electric load so as to maximize the profit in the interested period calculated by the calculator.

A computer program according to an aspect of the present invention causes, when executed on a computer, the computer to function as any of the power adjustment systems.

According to the aspects of the present invention, to maximize the profit defined as a difference between the income to be received for supplying power to the power grid and the cost to be paid for receiving power from the power grid with regard to the interested period, it is determined whether to supply power from the power storage apparatus to the electric load or from the power storage apparatus to the power grid. Therefore, when the customer facility including the power storage apparatus supplies power to the power grid, an advantage of improving the income of the person of the customer facility without forecast of a price in an electricity market can be expected.

DESCRIPTION OF EMBODIMENTS (Outline)

Figure 1:
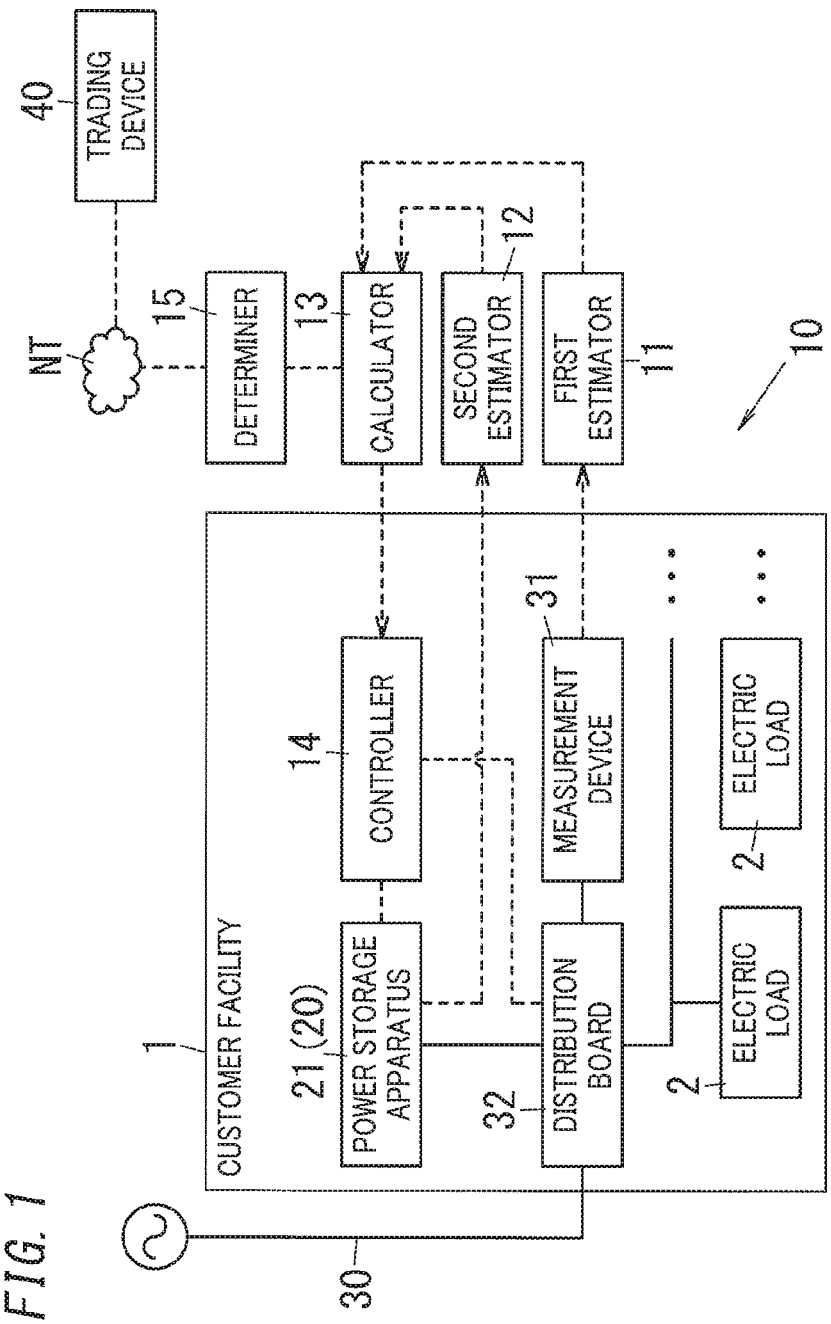
FIG. 1 is a block diagram of a power adjustment system according to Embodiment 1.

As shown in FIG. 1, a power adjustment system 10 described below includes a first estimator 11, a second estimator 12, a calculator 13, a controller 14, and a determiner 15. The first estimator 11 is configured to estimate power to be consumed by an electric load 2 of a customer facility 1 during an interested period to obtain first power information indicative of estimated power. The second estimator 12 is configured to estimate power obtainable from a power storage apparatus 21 of the customer facility 1 during the interested period to obtain second power information indicative of estimated power. The calculator 13 is configured to determine a profit with regard to the interested period by calculating a difference between income to be received for supplying power to a power grid 30 and a cost to be paid for receiving power from the power grid 30. The calculator 13 is configured to use, in order to determine the profit, first price information about a price for receiving power from the power grid 30 in the interested period, second price information about a price for supplying power to the power grid 30 in the interested period, the first power information, and the second power information. The controller 14 is configured to select one of a first state of supplying power from the power storage apparatus 21 to the power grid 30 and a second state of supplying power from the power storage apparatus 21 to the electric load 2. The determiner 15 is configured to provide the controller 14 with an instruction indicating a time for selecting one of the first state and the second state so as to maximize the profit in the interested period calculated by the calculator 13.

Desirably, the determiner 15 is configured to, when the income is smaller than the cost, instruct the controller 14 to select the second state, and, when the income is larger than the cost, determine that a necessary condition for participating in a market for an electricity trade is achieved. Alternatively, it is desirable that the determiner 15 is configured to, when the income is smaller than the cost, instruct the controller 14 to select the second state, and when the income is larger than the cost while stored energy in the power storage apparatus 21 is greater than a lower limit, determine that a necessary condition for participating in a market for an electricity trade is achieved.

Desirably, the determiner 15 is configured to, when a contract is established in the electricity trade, instruct the controller 14 to select the first state in accordance with a trade term of established contract of the electricity trade, and, when a contract is not established in the electricity trade, instruct the controller 14 to select the second state.

The customer facility 1 may include a power generation apparatus (photovoltaic power generation apparatus 22) configured to generate power with natural energy. In this case, desirably, the determiner 15 is configured to instruct the controller 14 to supply the power generated by the power generation apparatus (photovoltaic power generation apparatus 22) to the electric load 2.

In this case, the second estimator 12 may have a function to estimate power to be generated by the power generation apparatus (photovoltaic power generation apparatus 22) to obtain third power information indicative of estimated power. The calculator 13 is configured to revise the cost to reflect a decrease in the cost resulting from supply of the power generated by the power generation apparatus to the electric load 2 based on the third power information with regard to the interested period in addition to the first power information and the second power information to thereby obtain a revised cost. The calculator 13 determines the profit from a difference between the income and the revised cost.

The controller 14 may have a function to select one of a third state of supplying power from the power generation apparatus (photovoltaic power generation apparatus 22) to the electric load 2 and a fourth state of supplying power from the power generation apparatus (photovoltaic power generation apparatus 22) to the power storage apparatus 21. In this case, desirably, the determiner 15 is configured to, when the income is smaller than the cost, instruct the controller 14 to select the third state, and, when the income is larger than the cost, instruct the controller 14 to select the fourth state.

In this case, the second estimator 12 may have a function to estimate power to be generated by the power generation apparatus (photovoltaic power generation apparatus 22) to obtain third power information indicative of estimated power. The calculator 13 is configured to revise the income or the cost based on the third power information with regard to the interested period in addition to the first power information and the second power information. When the third state is selected, the calculator 13 revises the cost to reflect a decrease in the cost resulting from supply of the power generated by the power generation apparatus (photovoltaic power generation apparatus 22) to the electric load 2 to thereby obtain a revised cost, and determines the profit from a difference between the income and the revised cost. When the fourth state is selected, the calculator 13 revises the income to reflect an increase in the income resulting from storing of the power generated by the power generation apparatus (photovoltaic power generation apparatus 22) in the power storage apparatus 21 to thereby obtain a revised income, and determines the profit from a difference between the revised income and the cost.

In a power adjustment method described below, a first estimator 11 estimates power to be consumed by an electric load 2 of a customer facility 1 during an interested period to obtain first power information indicative of estimated power. A second estimator 12 estimates power obtainable from a power storage apparatus 21 of the customer facility 1 during the interested period to obtain second power information indicative of estimated power. A calculator 13 determines a profit with regard to the interested period by calculating a difference between income to be received for supplying power to a power grid 30 and a cost to be paid for receiving power from the power grid 30. The calculator 13 uses, for determining the profit, first price information about a price for receiving power from the power grid 30 in the interested period, second price information about a price for supplying power to the power grid 30 in the interested period, the first power information, and the second power information. A controller 14 selects one of a first state of supplying power from the power storage apparatus 21 to the power grid 30 and a second state of supplying power from the power storage apparatus 21 to the electric load 2 so as to maximize the profit in the interested period calculated by the calculator 13.

A computer program described below causes, when executed on a computer, the computer to function as the power adjustment system 10. The computer program may be provided through a telecommunication network NT such as the Internet, or a computer readable storage medium. A trading device 40 described below is constituted by a web-server managed by an electric utility or a cloud computing system, for example.

The power adjustment system 10 includes, as a main hardware component, a processor to operate in accordance with computer programs. The processor may be a micro computer with a built-in memory or an external memory, or may include multiple processors cooperating with each other. The processor may have any of various alternative forms.

The embodiments are described hereinbelow in further detail. According to the embodiments, the customer facility 1 includes the power supply apparatus 20, and receives power from the power grid 30.

The power supply apparatus 20 may include the power storage apparatus 21 including the storage battery and the photovoltaic power generation apparatus 22 including a solar battery. Alternatively, The power supply apparatus 20 may include the power storage apparatus 21 only. In a configuration where only the power storage apparatus 21 is provided, the storage battery of the power storage apparatus 21 is charged with power received from the power grid 30.

The power storage apparatus 21 may be a stationary type situated in a fixed place in the customer facility 1, or a portable type, or may be a storage battery for driving mounted on an electric vehicle (such as an electric car and a plug-in hybrid car). The power storage apparatus 21 includes a power converter for converting a direct-current power of the storage battery to an alternating-current power equivalent to an alternating-current power received from the power grid 30. Also, the power storage apparatus 21 may include a capacitor having a high-capacitance, a configuration for converting the electricity to another form of energy and storing it, or the like. The photovoltaic power generation apparatus can be replaced with a power generation apparatus using another kind of energy such as wind power, water energy, and geothermal energy, as long as it can generate electricity from natural energy.

It is assumed that the customer facility 1 is a non-residential facility such as a hospital, a hotel, and a factory. The below described technique can be applied to a building such as a condominium, an office building, and a commercial building that includes multiple dwelling unit, offices, or shops by treating an aggregate of the multiple dwelling unit, offices, or shops as one customer facility 1, provided that power of the whole building is managed collectively. In an example, distribution boards may be provided to the dwelling units, offices, or shops, respectively, and a main distribution board for distributing power to each of whole units of the building may be provided to a building manager office or an electric room. Also, in a building that is adapted for collectively receiving power at high voltage, there is provided an electricity meter for the collective power receiving at high voltage as a measurement device 31. In this case, therefore, it is possible to measure the total power received by the building. The below described technique also can be applied to detached houses, provided that detached houses in an area can be managed collectively as one aggregate. For example, when there is an electricity aggregator that manages respective power of the power supply apparatuses 20 of the detached houses, the detached houses can be treated as one customer facility 1.

When the customer facility 1 is a hospital, a hotel, a factory, a condominium, an office building, a commercial building, or the like, a capacitance of the power storage apparatus 21 is 100 kWh or more, and in some cases there may be provided the power storage apparatus 21 having a capacitance of more than 1000 kWh. Also, in an area where multiple detached houses exist, there can be provided a power storage apparatus 21 with a large capacitance so as to be shared by the multiple detached houses.

In the above described case where the multiple dwelling units or the like in one aggregate share the power supply apparatus 20, desirably, there exists a service provider so that the electric utility for supplying power to the multiple dwelling units or the like through the power grid 30 can collectively treat the multiple dwelling units or the like in the aggregate as one customer facility 1. Such a kind of service provider supplies various services to the multiple dwelling units, offices, shops, or detached houses in an aggregate on behalf of the electric utility that performs a power generation business. An example of the service provider is a demand response service provider including an electricity aggregator.

The electric utility may be an electricity utility selected from a general electricity utility (power company), an independent power producer, a specified electricity utility, a power producer and supplier, and the like, or may be a service provider that does not perform a power generation business but purchases power from another company to sell the purchased power to customer facilities 1.

When the customer facility 1 is a detached house, a capacitance of the power storage apparatus 21 is around a range of 1 to 10 kWh. However, the below described technique also can be applied to such a small-scale power storage apparatus 21, as long as an electricity trade is permitted.

Embodiment 1

As shown in FIG. 1, in the present embodiment, a power supply apparatus 20 includes a power storage apparatus 21 only. That is, a customer facility 1 includes, in addition to electric loads 2 that consume power, the power storage apparatus 21 that is permitted to supply power to a power grid 30. Also, a distribution board 32 is installed in the customer facility 1. The power grid 30, the power storage apparatus 21, and the electric loads 2 are connected to the distribution board 32. The distribution board 32 includes a main circuit (not shown) for receiving power from the power grid 30 and branch circuits (not shown) that are branched from the main circuit and constitute multiple systems. The distribution board 32 therefore forms a distribution network in the customer facility 1 to allow power received from the power grid 30 to be supplied to the electric loads 2 connected to the multiple systems.

Periods for charging and discharging of a storage battery included in the power storage apparatus 21 and electricity therein are controlled by a controller 14. In the present embodiment, the storage battery of the power storage apparatus 21 is charged by the power received from the power grid 30. Switching between a first state of supplying power from the power storage apparatus 21 to the power grid 30 and a second state of supplying power from the power storage apparatus 21 to the electric loads 2 is performed by the controller 14 by way of switching a selector (not shown) which is built in the distribution board 32.

When the controller 14 selects the first state, power is flowed back to the power grid 30. In this case, the person of the customer facility 1 can receive from an electric utility or a service provider a reward (income) for the power flowed back to the power grid 30. When the controller 14 selects the second state, power supplied from the power storage apparatus 21 compensates for at least part of power required by the electric loads 2 of the customer facility 1. In this case, therefore, power received from the power grid 30 can be reduced. In other words, when the second state is selected, an amount of money (cost) to be paid by the person of the customer facility 1 for receiving power from the power grid 30 can be reduced.

The distribution board 32 is provided with a measurement device 31 for measuring respective power passing through the main circuit and the branch circuits. The measurement device 31 may be housed in a housing of the distribution board 32, or may be housed in a housing different from that of the distribution board 32. However, the value of power passing through the main circuit can be substituted for a value measured with an electricity meter (power meter) installed in the customer facility 1. Respective power passing through the branch circuits may be respectively measured with measurement units provided separately from the distribution board 32. With regard to the power passing through the main circuit, the power received from the power grid 30 and the power flowed back to the power grid 30 are measured separately.

Desirably, the measurement device 31 is composed of an electronic electricity meter including: current sensors (not shown) each of which measures a current flowing through an interest circuit; and a calculator (not shown) for calculating power with regard to each interest circuit based on a value of a line voltage of the interest circuit and a current value measured with a current sensor. According to the present embodiment, the measurement device 31 is not required to measure the respective power passing through the branch circuits, as long as the measurement device 31 is able to measure at least total power consumed by the electric loads 2.

The power storage apparatus 21 also has a function to measure an amount of remaining power (stored energy) of the storage battery (not shown) of the power storage apparatus 21. It is minimally required to have a function to measure the amount of remaining power at a start time of charging or discharging of the storage battery, and it is preferable to further have a function to measure the amount of remaining power at an end time of charging or discharging thereof, although a technique for measuring an amount of remaining power of a storage battery on a real-time basis is available.

The objective of the present embodiment is to maximize a profit with regard to an interested period, which is defined as a difference between an amount of money (income) to be received for supplying power to the power grid 30 and an amount of money (cost) to be paid for receiving power from the power grid 30.

Unit price for power selling of supplying power to the power grid 30 and unit price for power purchasing of receiving power from the power grid 30 are determined in accordance with an arrangement with the electric utility, and may vary depending on the season, the time, the amount of power (energy per thirty minutes, for example). Also, the power consumed by the electric loads 2 in the customer facility 1 varies with time. Moreover, the power received from or supplied to the power grid 30 varies depending on a situation whether the power stored in the power storage apparatus 21 is supplied to the power grid 30 or supplied to the electric loads 2. Therefore, when a certain interested period is considered, the profit with regard to this interested period can be maximized in consideration of the above factors and relations.

For example, at the time "t", a unit price of power for power selling is represented by "$U1(t)$", a unit price of power for power purchasing is represented by "$U2(t)$", power consumed by the electric loads 2 is represented by "$Wc(t)$", and power which the power storage apparatus 21 can output (discharge) is represented by "$Ws(t)$". The power used for charging the power storage apparatus 21 is not taken into consideration in this example. The above unit prices each are a price per power of an amount equal to a minimum amount of power for selling and purchasing.

When an equation "$Ws(t)>Wc(t)$" is satisfied, possible minimum income is expressed by an equation "$U1(t)\times(Ws(t)-Wc(t))$". When the power storage apparatus 21 has dischargeable power Ws(t), possible maximum income is expressed by an equation "$U1(t)\times Ws(t)$". That is, the income is minimized when the dischargeable power Ws(t) of the power storage apparatus 21 is consumed by the electric loads 2 as much as possible. The income is maximized when the dischargeable power Ws(t) of the power storage apparatus 21 is entirely supplied to the power grid 30.

When an equation "$Ws(t)<Wc(t)$" is satisfied, a possible minimum cost is expressed by an equation "$U2(t)\times(Wc(t)-Ws(t))$". A possible maximum cost is expressed by an equation "$U2(t)\times Ws(t)$", regardless of the dischargeable power Ws(t) of the power storage apparatus 21. That is, the cost is minimized when a whole of the dischargeable power Ws(t) of the power storage apparatus 21 is consumed by the electric loads 2. The cost is maximized when the power Wc(t) consumed by the electric loads 2 is fully received from the power grid 30.

An interested period includes at least one of: profitable period and a payable period. The interested period may include both the profitable period and the payable period, but both of the periods do not occur simultaneously. Either the income or the cost is generated in each time. It is therefore possible to select one of the first state of supplying power to the power grid 30 and the second state of receiving power from the power grid 30 so as to maximize the profit with regard to the interested period.

The first state and the second state are selected so as to maximize the profit with regard to the interested period.

Therefore, it is necessary to estimate various possible profits in accordance with various conditions. The profit is calculated by a calculator 13.

For the calculator 13 calculating the profit with regard to the interested period, first price information about a price (unit price) for receiving power from the power grid 30, and second price information about a price (unit price) for supplying power to the power grid 30 are necessary. Each of the first price information and the second price information is determined in accordance with a contract with the electric utility, and is obtained from a computer server managed by the electric utility through a telecommunication network NT such as the Internet, or entered by the person of the customer facility 1 through an input device. The input device may be a dedicated device attached to a power adjustment system 10, or an external device that can communicate with the power adjustment system 10 through a communication interface thereof, such as a computer, a smartphone, a tablet terminal, and the like. Each of the first price information and the second price information is stored in a memory (not shown) of the power adjustment system 10.

For the calculator 13 calculating the profit with regard to the interested period, information (first power information) about a dynamical change in the power consumed by the electric loads 2 during this interested period, and information (second power information) about the power that the power storage apparatus 21 can output are necessary. The interested period is not a past time period but a time period after a time when the calculator 13 performs the calculation of the profit. Therefore, each of the first power information and the second power information is needed to be estimated (extrapolated).

In this regard, the power adjustment system 10 includes a first estimator 11 for estimating the first power information with regard to the interested period, and a second estimator 12 for estimating the second power information with regard to the interested period. For the first estimator 11 estimating the first power information and for the second estimator 12 estimating the second power information, past actual results regarding the customer facility 1 are necessary. Each of the first power information and the second power information with regard to the interested period is estimated based on an actual past result(s) where a condition(s) is similar to that of the interested period.

The condition(s) used for estimating the first power information and the second power information with regard to the interested period is selected from the season, the time, the day of week, the weather, the temperature, and the like. Higher accuracy of the estimation can be expected with higher similarity of the conditions. When the estimation is performed immediately before the interested period, the first estimator 11 and the second estimator 12 may estimate the first power information and the second power information while taking the past result immediately before the estimation into consideration.

After the first estimator 11 estimates the first power information and the second estimator 12 estimates the second power information, a determiner 15 determines a point of time for selecting one of the first state and the second state so as to maximize the profit in the interested period calculated by the calculator 13. The determiner 15 provides the controller 14 with an instruction indicative of the determined point of time. The controller 14 selects one of the first state and the second state in accordance with the point of time indicated by the determiner 15.

In the present embodiment, it is assumed that there exists an electricity market. An electricity trade can be made when there are a buyer of power and a seller who can meet a request of the buyer. For the electricity trade, the buyer and the seller of power submit applications indicative of their trade terms. The electricity market is managed by the trading device 40. Terminal devices of the buyer and the seller transmit the trading terms to the trading device 40 through the telecommunication network NT such as the Internet, and thereby the electricity trade is performed.

The trading device 40 tries to find, based on the trading term provided by the buyer and the trading term provided by the seller, a demand-supply equilibrium point. When an equilibrium point can be obtained, the trading device 40 establishes a contract of an electricity trade. When an equilibrium point cannot be obtained, the trading device 40 determines that the electricity trade is failed. The trading term contains information on: an implementation period for transferring power; power (or energy) for the implementation period; and a price of the power (unit price or total price). The trading device 40 notifies the terminal devices of the buyer and the seller of the result of the electricity trade. When a contract is established in the electricity trade, the trading device 40 also notifies the terminal devices of a trading term of the established contract. Note that, in the present embodiment, the power adjustment system 10 serves as the terminal device.

In an example for the electricity trade of the present embodiment, each of the seller and buyer of power is allowed to submit a trading term having multiple conditions. With regard to the implementation period of the trading term, when there is an overlap between the trading term suggested by the buyer and the trading term suggested by the seller, it is possible to conduct an electricity trade. In other words, it is possible to conduct an electricity trade when the implementation period suggested by the seller overlaps with the implementation period requested by the buyer. With regard to the power and the price of the trade term, each of the seller and buyer suggests two or more pairs thereof. The trading device 40 determines the point at which a price of a trade term of the seller agrees to a price of the trade term of the buyer as the equilibrium point.

Generally, a buyer of power determines the multiple pairs of power and price so that the power to be purchased increases with a decrease in the price, and a seller of power determines the multiple pairs of power and price so that the power to be sold increases with an increase of the price. The trading device 40 therefore can find an equilibrium point, provided that there is an overlap between a range of the price determined by the buyer of power and a range of the price determined by the seller of power.

Figures 2, 3A, 3B:
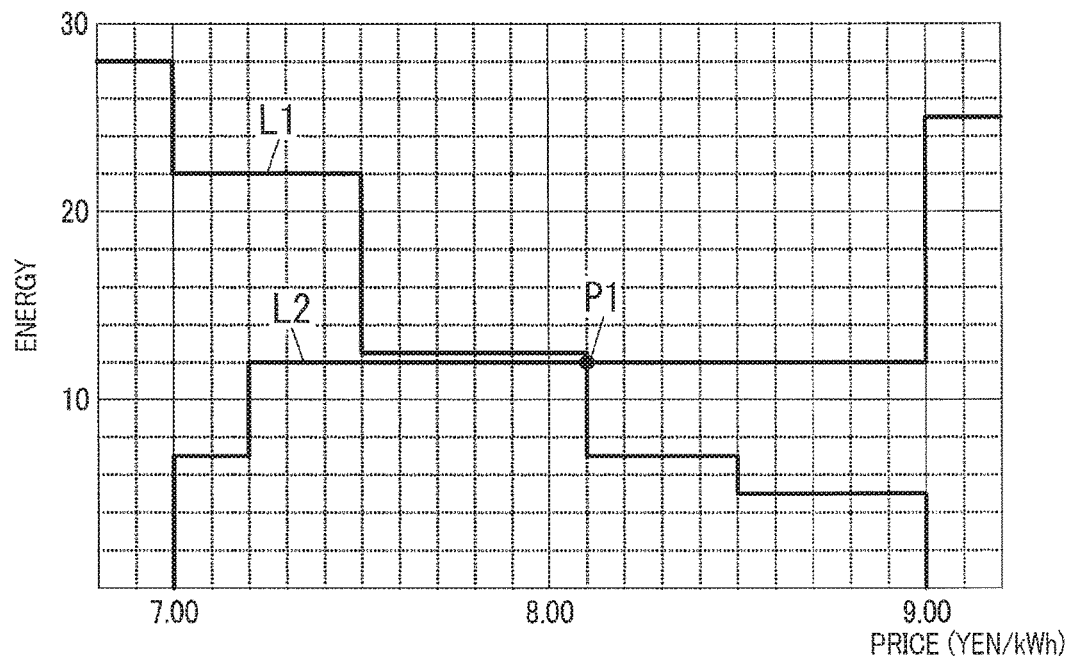
FIG. 2 is a diagram for illustrating a method how to determine a price according to Embodiment 1.
FIG. 3A and FIG. 3B are diagrams for illustrating an example of an electricity trade according to Embodiment 1.

FIG. 2 illustrates an example of the electricity trade conducted through the trading device 40. In the illustrated example, information on a pair of energy and a unit price of power per 1 kWh is used for conducting the electricity trade. FIG. 2 is related to a case where: a relation between the energy to be purchased per hour basis and the unit price of the seller of power is shown in FIG. 3A; and a relation between the energy to be sold per hour basis and the unit price of the buyer of power is shown in FIG. 3B.

In the example related to FIG. 3A and FIG. 3B, the buyer of power can purchase 28000 kWh of energy when the unit price is 7.00 yen or less, and can purchase 5000 kWh of energy when the unit price is more than 8.50 yen but 9.00 yen or less. The buyer of power will abandon the power purchasing when the unit price is more than 9.00 yen. Meanwhile, the seller of power can sell energy up to 7000 kWh when the unit price is more than 7.00 yen but 7.20 yen or less, and can sell energy up to 25000 kWh when the unit price is more than 9.00 yen. The seller of power will not sell the power when the unit price is 7.00 yen or less.

FIG. 2 shows lines indicating the relations between the energy and the unit price, which includes a line related to the buyer which is referred to as "demand line L1", and a line related to the seller which is referred to as "supply line L2". Referring to the lines, an intersection point P1 of the demand line L1 and the supply line L2 indicates a point (equilibrium point) at which the energy requested by the buyer is equal to the exchanging energy which the seller can supply. According to the relations shown in FIG. 2, a contract is established with a term of the amount of energy of 12000 kWh per hour basis and the unit price of 8.10 yen per 1 kWh.

When the equilibrium point is determined between the buyer and the seller, the trading device 40 notifies the buyer and the seller of the result of establishment and the term of the established contract. Note that when there is a shortfall in the energy in the established contract compared to the energy requested by the buyer, the energy for compensating for the shortfall will be supplied in another way. In this example, the energy in the established contract is 12000 kWh per hour basis. Therefore, when the energy requested by the buyer is 13000 kWh per hour basis for example, there is a shortfall of 1000 kWh. The energy compensating for the shortfall will be supplied in another way.

The above described trading example is a mere example, and in an actual case, there would exist many participators and thus a lot of alternative contracts would be possibly established. It is therefore desirable that an appropriate contract is selected in accordance with an algorithm capable of obtaining a certainly suitable solution within a finite time, such as a probabilistic algorithm and genetic algorithm.

In the example describe above, each of the demand line L1 and the supply line L2 is expressed by a polygonal line constituted by a combination of line segments, but may be expressed by a smooth and continuous curved line. The relation between the demand line L1 and the supply line L2 is determined in accordance with respective environmental conditions of the buyer and the seller. Examples of the environmental condition include financial power of the buyer and/or the seller, degree of urgency of demand of the power, and the like.

In the present embodiment, a necessary condition for the power adjustment system 10 to participate in an electricity trade of the trading device 40 is that the price for supplying power to the power grid 30 is higher than the price for receiving power from the power grid 30 in the interested period. In this case, in a period in which the price for power selling is higher than the price for power purchasing, when the customer facility 1 supplies power from the power storage apparatus 21 to the power grid 30 and receives power for the electric loads 2 from the power grid 30, the person of the customer facility 1 can earn a profit corresponding to a difference between the prices of power selling and power purchasing.

Therefore, the determiner 15 determines that the necessary condition for participating in an electricity trade is achieved when the price for supplying power to the power grid 30 is higher than the price for receiving power from the power grid 30. When this necessary condition is achieved, the determiner 15 is permitted to request a participation in an electricity trade to submit a trading term to the trading device 40. However, in the present embodiment, the power supplied to the power grid 30 is provided from the power storage apparatus 21. Depending on a time when power is supplied from the power storage apparatus 21 in the interested period, supply of power from the power storage apparatus 21 to the power grid 30 may not be possible.

It is therefore desirable that the determiner 15 refers to the stored energy of the storage battery measured with the power storage apparatus 21 and has an additional necessary condition for participating in an electricity trade that the stored energy is greater than a lower limit. The lower limit on the stored energy is determined in consideration with the power to be consumed by the electric loads 2. The power to be consumed by the electric loads 2 is estimated as described above, and therefore the lower limit may be determined as a value obtained by adding a constant value (margin) to a value of the power to be supplied to the electric loads 2.

The stored energy of the power storage apparatus 21 in the interested period, which indicates the energy obtainable from the power storage apparatus 21, is estimated by the second estimator 12 as described above. Therefore, the determiner 15 participates in an electricity trade, provided that the price for power selling is higher than the price for power purchasing and also the stored energy estimated by the second estimator 12 is greater than the lower limit, based on the first power information, the second power information, and the information estimated by the second estimator 12. That is, the determiner 15 sends a request to the trading device 40 for participating in an electricity trade when these two necessary conditions are achieved.

Even when the power adjustment system 10 sends a request for participating in an electricity trade to the trading device 40, a contract for the electricity trade is not always established, for example in a case where trade terms are not met together, or in a case where a trade term suggested by another seller is advantageous for the buyer, or the like. When no contract is established in the electricity trade, the determiner 15 does not supply power to the power grid 30 and instructs the controller 14 to allow the power storage apparatus 21 to supply power to the electric loads 2 as needed. That is, the determiner 15 instructs the controller 14 to select the second state when a contract is established in the electricity trade, but instructs the controller 14 to select the first state when a contract is not established in the electricity trade.

The determiner 15 also instructs the controller 14 to select the first state when the price for supplying power from the power storage apparatus 21 to the power grid 30 is lower than the price for receiving power from the power grid 30. In short, when the price for receiving power from the power grid 30 is high and the price for supplying power to the power grid 30 is low, the first state is selected, because a larger profit is expected to be earned by the person of the customer facility 1 by reducing the power to be received from the power grid 30 and increasing the power to be supplied from the power storage apparatus 21 to the electric loads 2.

The determiner 15 compares, in a process of an electricity trade, a price in conformity with the established contract of the electricity trade with a price not in conformity with the established contract of the electricity trade with regard to the interested period, as in the case where the determiner 15 determines whether to participate or not in an electricity trade by comparing the price for power selling and the price for power purchasing. In the electricity trade processing, when determining that it is not possible to agree to the price suggested by the buyer, the determiner 15 determines that the electricity trade is failed.

In the configuration example described above, the interested period may be a period around one day, or a period within a range from one week to three months, or the like.

Considered in one-day basis, change in power consumed by the electric loads 2 with time would significantly different between a week day and a holiday. Therefore, with regard to the week day and the holiday, different time slots may be set as the interested periods. Alternatively, the interested period may be set so as to include both the week day and the holiday.

According to the configuration example of the power adjustment system 10 described above, the first estimator 11, the second estimator 12, the calculator 13, the controller 14, and the determiner 15 may be provided in the customer facility 1, or alternatively, the above components other than the controller 14 may be provided separately from the customer facility 1. In a case where at least one of these components is provided separately from the customer facility 1, the power adjustment system 10 may be realized by use of a web server or a cloud computing system.

In such a configuration, desirably, the customer facility 1 is provided with a communication interface for sending, to the first estimator 11 and the second estimator 12, respectively, the first power information obtained from the measurement device 31 of the customer facility 1 and the second power information measured with the power storage apparatus 21. Desirably, the customer facility 1 is provided with a communication interface for allowing the determiner 15 to notify the controller 14 of information whether a contract is established.

That is, when the customer facility 1 is provided with the communication interface, the customer facility 1 can receive services from the trading device 40 without the customer facility 1 including the first estimator 11, the second estimator 12, the calculator 13, and the determiner 15. The determiner 15 sends information to the controller 14 through the calculator 13 in the illustrated example, but the determiner 15 may send information to the controller 14 without through the calculator 13.

The power storage apparatus 21 is stationary situated in the customer facility 1 in the embodiment described above, but the storage battery of the power storage apparatus 21 may be a storage battery of an electric vehicle. Also, other conditions may be further taken into consideration for finally determining whether the power storage apparatus 21 supplies power to the electric loads 2 or to the power grid 30.

Embodiment 2

Figure 4:
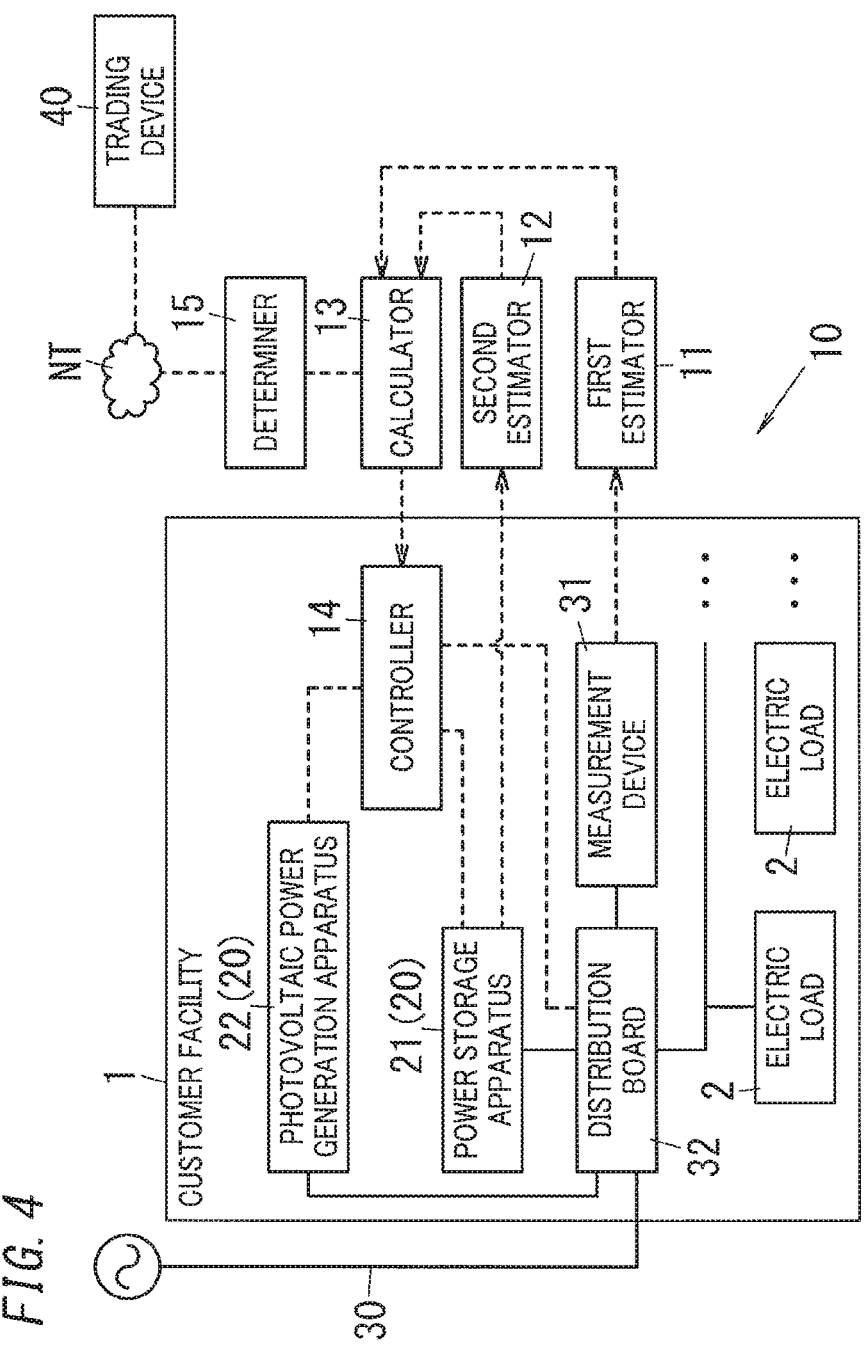
FIG. 4 is a block diagram of a power adjustment system according to Embodiment 2.

The power supply apparatus 20 according to Embodiment 1 includes the power storage apparatus 21 only, but a power supply apparatus 20 according to the present embodiment includes a photovoltaic power generation apparatus 22, as shown in FIG. 4. With regard to the photovoltaic power generation apparatus 22, charging does not need to be considered unlike the power storage apparatus 21. However, generating power of the photovoltaic power generation apparatus 22 is not constant, and obtainable power thereof varies from time to time depending on temperature, intensity, incident angle and wavelength component of light striking solar cells of the photovoltaic power generation apparatus 22, or the like. Also, the photovoltaic power generation apparatus 22 does not output a constant voltage, but is configured so that the output voltage follows a line voltage of a power distribution network. That is, with regard to the photovoltaic power generation apparatus 22, when the generating power fluctuates during a period in which power is received from a power grid 30, the voltage output from the photovoltaic power generation apparatus 22 is maintained at the voltage of the power grid 30, but the current thereof varies depending on the fluctuation of the power.

The power generated by the photovoltaic power generation apparatus 22 can be estimated based on the weather condition, the temperature, and the like. That is, a second estimator 12 of the present embodiment estimates the power to be generated by the photovoltaic power generation apparatus 22 in addition to stored energy of the power storage apparatus 21. Hereinafter, information on the power estimated to be generated by the photovoltaic power generation apparatus 22 is referred to as "third power information". Desirably, the third power information is estimated with regard to not only the interested period but a period before the interested period.

The power generated by the photovoltaic power generation apparatus 22 is used for the power supplied to electric loads 2 or for charging of the power storage apparatus 21. That is, the controller 14 has a function to select one of a third state of supplying power from the photovoltaic power generation apparatus 22 to the electric loads 2 and a fourth state of supplying power from the photovoltaic power generation apparatus 22 to the power storage apparatus 21.

Switching of the controller 14 between the third state and the fourth state is determined by the determiner 15 in accordance with a magnitude relationship between income and cost. That is, the determiner 15 compares, with regard to the interested period, the income to be received by supplying power to the power grid 30 with the cost to be paired for receiving power from the power grid 30. The determiner 15 selects the third state when the income is smaller than the cost, whereas selects the fourth state when the income is larger than the cost.

In short, when the income to be received for suppling power from the power storage apparatus 21 to the power grid 30 is smaller than the cost to be paid for receiving power from the power grid 30 with regard to the interested period, the power generated by the photovoltaic power generation apparatus 22 is supplied to the electric loads 2 to reduce the cost for receiving power. Meanwhile, when the income to be received for suppling power from the power storage apparatus 21 to the power grid 30 is larger than the cost to be paid for receiving power from the power grid 30 with regard to the interested period, the power generated by the photovoltaic power generation apparatus 22 is used for charging the power storage apparatus 21 for a future trade in an electricity market. The power generated by the photovoltaic power generation apparatus 22 can be charged in the power storage apparatus 21 during a period before the interested period, and also can be charged in the power storage apparatus 21 during the interested period.

As described above, the second estimator 12 estimates the power to be generated by the photovoltaic power generation apparatus 22 to obtain the third power information indicative of estimated power. The calculator 13 therefore can calculate the income based on not only the first power information (indicative of power to be consumed by the electric loads 2) and the second power information (indicative of power to be obtainable from the power storage apparatus 21) but also the third power information with regard to the interested period.

When the power generated by the photovoltaic power generation apparatus 22 is preferentially supplied to the electric loads 2 in the interested period, the power received by the customer facility 1 from the power grid 30 is reduced by the power supplied from the photovoltaic power generation apparatus 22 to the electric loads 2. Therefore, the cost to be paid for receiving power from the power grid 30 can be reduced compared to a case where there is no photovoltaic power generation apparatus 22.

The calculator 13 revises the cost to reflect a decrease in the cost resulting from the generating power of the photovoltaic power generation apparatus 22 based on the third power information in addition to the first power information and the second power information. The calculator 13 calculates a profit based on the income determined in accordance with the second power information and the revised cost determined in accordance with the first power information and the third power information. The profit calculated by the calculator 13 is dealt as with the profit described in Embodiment 1, namely, the controller 14 selects the first state when there is no expected profit and the controller 14 selects the second state when there is a profit expected.

From another view point, supply of the power generated by the photovoltaic power generation apparatus 22 to the electric loads 2 means a reduction of power supplied from the power storage apparatus 21 to the electric loads 2. In this view point, it is possible to say that an amount of power tradeable in the electricity market is increased in the power stored in the power storage apparatus 21, compared to a case where there is no photovoltaic power generation apparatus 22. That is, the calculator 13 may, based on the third power information with regard to the interested period in addition to the second power information, revise the second power information by means of the third power information so as to reflect the increase in the income. In this case, the calculator 13 determines the profit from a difference between the revised income and the cost.

As described above, desirably, in a process where the controller 14 selects one of the third state and the fourth state, the calculator 13 uses the third power information with regard to the interested period in addition to the first power information and the second power information to revise at least one of the income and the cost. That is, as described above, when the third state is selected, the calculator 13 revise the cost to reflect a decrease in the cost resulting from supply of the power generated by the photovoltaic power generation apparatus 22 to the electric loads 2 to thereby obtain a revised cost. The calculator 13 determines the profit from a difference between the income and the revised cost. When the fourth state is selected, the calculator 13 revise the income to reflect an increase in the income resulting from storing of the power generated by the photovoltaic power generation apparatus 22 in the power storage apparatus 21 to obtain a revised income. The calculator 13 calculates a profit based on the revised income and cost.

The third power information may contain information about an estimation of power to be generated by the photovoltaic power generation apparatus 22 during a period before the interested period. In this case, it is desirable that the first power information and the second power information each contain information related to the period before the interested period. That is, an estimated value of power to be consumed by the electric loads 2, an estimated value of the stored energy of the power storage apparatus 21, and an estimated value of power to be generated by the photovoltaic power generation apparatus 22 are obtained with regard to the period before the interested period of a future period. Based on these estimated values, it is possible to control charging and discharging of the power storage apparatus 21 so as to allow the power storage apparatus 21 to be fully charged at a start time of the interested period.

When the power generated by the photovoltaic power generation apparatus 22 is greater than the power consumed by the electric loads 2 to produce surplus power and also the power storage apparatus 21 is fully charged, the surplus power can be flowed back to the power grid 30 to earn an income for the sold power. When there is surplus power and the power storage apparatus 21 is not fully charged, the surplus power may be used for charging the power storage apparatus 21.

Other configurations and operations according to the present embodiment are same as those in Embodiment 1. According to the present embodiment, the power supply apparatus 20 includes not only the power storage apparatus 21 but also the photovoltaic power generation apparatus 22. It is accordingly possible to increase the available power, and increase of the profit can be expected. The photovoltaic power generation apparatus 22 generates power with natural energy and causes no cost for generating power, and thus increase of the profit is further expected. In the present embodiment, the photovoltaic power generation apparatus 22 may be replaced with another kind of power generation apparatus that generates power with natural energy such as wind power, water energy, and geothermal energy, as described above.

The invention claimed is:

1. A power adjustment system, comprising:
 a first estimator configured to estimate power to be consumed by an electric load of a customer facility during an interested period to obtain first power information indicative of estimated power;
 a second estimator configured to estimate power obtainable from a power storage apparatus of the customer facility during the interested period to obtain second power information indicative of estimated power;
 a calculator configured to determine a profit with regard to the interested period by calculating a difference between income to be received for supplying power to a power grid and a cost to be paid for receiving power from the power grid, based on first price information about a price for receiving power from the power grid, second price information about a price for supplying power to the power grid in the interested period, the first power information, and the second power information;
 a controller configured to select one of a first state of supplying power from the power storage apparatus to the power grid and a second state of supplying power from the power storage apparatus to the electric load; and
 a determiner configured to provide the controller with an instruction indicating a time for selecting one of the first state and the second state so as to maximize the profit in the interested period calculated by the calculator,
 wherein the determiner determines a point of time for selecting one of the first state and the second state so as to maximize the profit in the interested period calculated by the calculator and provides the controller with an instruction indicative of the determined point of time, and
 the controller is configured to select one of the first state and the second state by way of switching a selector which is built in a distribution board based on the determined point of time.

2. The power adjustment system of claim 1, wherein the determiner is configured to
 when the income is smaller than the cost, instruct the controller to select the second state, and when the income is larger than the cost, determine that a necessary condition for participating in a market for an electricity trade is achieved.

3. The power adjustment system of claim 1, wherein the determiner is configured to
when the income is smaller than the cost, instruct the controller to select the second state, and
when the income is larger than the cost while stored energy in the power storage apparatus is greater than a lower limit, determine that a necessary condition for participating in a market for an electricity trade is achieved.

4. The power adjustment system of claim 2, wherein the determiner is configured to
when a contract is established in the electricity trade, instruct the controller to select the first state in accordance with a trade term of established contract of the electricity trade, and
when a contract is not established in the electricity trade, instruct the controller to select the second state.

5. The power adjustment system of claim 1, wherein
the customer facility further includes a power generation apparatus configured to generate power with natural energy, and
the determiner is configured to instruct the controller to supply the power generated by the power generation apparatus to the electric load.

6. The power adjustment system of claim 5, wherein
the second estimator has a function to estimate power to be generated by the power generation apparatus to obtain third power information indicative of estimated power, and
the calculator is configured to
revise the cost to reflect a decrease in the cost resulting from supply of the power generated by the power generation apparatus to the electric load based on the third power information with regard to the interested period in addition to the first power information and the second power information to thereby obtain a revised cost, and determine the profit from a difference between the income and the revised cost.

7. The power adjustment system of claim 1, wherein
the customer facility further includes a power generation apparatus configured to generate power with natural energy,
the controller has a function to select one of a third state of supplying power from the power generation apparatus to the electric load and a fourth state of supplying power from the power generation apparatus to the power storage apparatus, and
the determiner is configured to
when the income is smaller than the cost, instruct the controller to select the third state, and
when the income is larger than the cost, instruct the controller to select the fourth state.

8. The power adjustment system of claim 7, wherein
the second estimator has a function to estimate power to be generated by the power generation apparatus to obtain third power information indicative of estimated power, and
the calculator is configured to,
based on the third power information with regard to the interested period in addition to the first power information and the second power information,
when the third state is selected, revise the cost to reflect a decrease in the cost resulting from supply of the power generated by the power generation apparatus to the electric load to thereby obtain a revised cost, and determine the profit from a difference between the income and the revised cost, and
when the fourth state is selected, revise the income to reflect an increase in the income resulting from storing of the power generated by the power generation apparatus in the power storage apparatus to thereby obtain a revised income, and determine the profit from a difference between the revised income and the cost.

9. The power adjustment system of claim 3, wherein
the determiner is configured to
when a contract is established in the electricity trade, instruct the controller to select the first state in accordance with a trade term of established contract of the electricity trade, and
when a contract is not established in the electricity trade, instruct the controller to select the second state.

10. The power adjustment system of claim 7, wherein the power generation apparatus is a photovoltaic power generation apparatus.

11. A power adjustment method, comprising:
estimating, by a first estimator, power to be consumed by an electric load of a customer facility during an interested period to obtain first power information indicative of estimated power;
estimating, by a second estimator, power obtainable from a power storage apparatus of the customer facility during the interested period to obtain second power information indicative of estimated power;
determining, by a calculator, a profit with regard to the interested period by calculating a difference between income to be received for supplying power to a power grid and a cost to be paid for receiving power from the power grid, based on first price information about a price for receiving power from the power grid in the interested period, second price information about a price for supplying power to the power grid in the interested period, the first power information, and the second power information;
selecting, by a controller, one of a first state of supplying power from the power storage apparatus to the power grid and a second state of supplying power from the power storage apparatus to the electric load;
providing, by a determiner, the controller with an instruction indicating a time for selecting one of the first state and the second state so as to maximize the profit in the interested period calculated by the calculator;
determining, by the determiner, a point of time for selecting one of the first state and the second state so as to maximize the profit in the interested period calculated by the calculator and provides the controller with an instruction indicative of the determined point of time; and
selecting, by the controller, one of the first state and the second state by way of switching a selector which is built in a distribution board.

12. A non-transitory computer-readable recording medium recording a computer program that when executed on a computer, causes the computer to function as a power adjustment system,
wherein the power adjustment system comprises:
a first estimator configured to estimate power to be consumed by an electric load of a customer facility during an interested period to obtain first power information indicative of estimated power;

a second estimator configured to estimate power obtainable from a power storage apparatus of the customer facility during the interested period to obtain second power information indicative of estimated power;

a calculator configured to determine a profit with regard to the interested period by calculating a difference between income to be received for supplying power to a power grid and a cost to be paid for receiving power from the power grid, based on first price information about a price for receiving power from the power grid, second price information about a price for supplying power to the power grid in the interested period, the first power information, and the second power information;

a controller configured to select one of a first state of supplying power from the power storage apparatus to the power grid and a second state of supplying power from the power storage apparatus to the electric load; and a determiner configured to provide the controller with an instruction indicating a time for selecting one of the first state and the second state so as to maximize the profit in the interested period calculated by the calculator, wherein the determiner determines a point of time for selecting one of the first state and the second state so as to maximize the profit in the interested period calculated by the calculator and provides the controller with an instruction indicative of the determined point of time, and the controller is configured to select one of the first state and the second state by way of switching a selector which is built in a distribution board.

* * * * *